March 15, 1927.
D. H. COX
TIRE REPAIR DEVICE
Filed Jan. 27, 1926
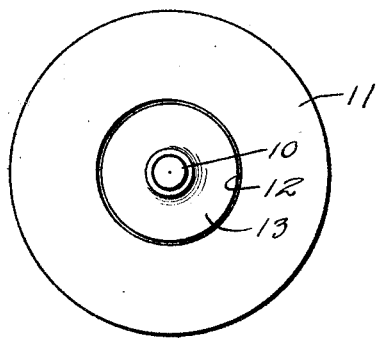
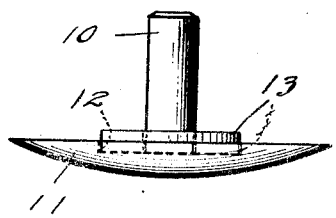
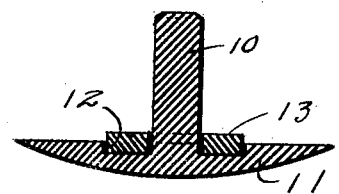
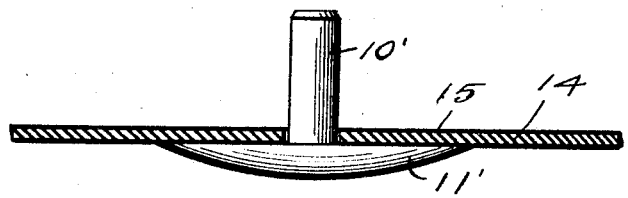
Inventor
David H. Cox.
By
Attorney Patented Mar. 15, 1927.

1,621,154

UNITED STATES PATENT OFFICE.

DAVID H. COX, OF ROSELLE, NEW JERSEY.

TIRE-REPAIR DEVICE.

Application filed January 27, 1926. Serial No. 84,186.

This invention relates to new and useful improvements in repairing devices, and particularly to devices for repairing punctures in tires.

One object of the invention is to provide a device of this character which is simple in construction, durable and effective in its operation, and which can be manufactured at a low cost.

Another object is to provide a repair plug which is adapted to be inserted in the opening of a puncture in a tire casing, and which includes means adapted to flow into and fill the crevices at the raw and rough edges of the puncture opening.

Other objects and advantages will be apparent from the following description when taken in connection with the accompanying drawing.

In the drawing:

Figure 1 is a plan view of a repair plug made in accordance with the preferred form of the invention.

Figure 2 is a side elevation of the same.

Figure 3 is a vertical transverse sectional view.

Figure 4 is an elevation of a plug wherein the recess is omitted, and a sheet of friction cloth is disposed on the plug.

Referring particularly to the accompanying drawing, the plug includes the stem portion 10, and the horizontal flange portion 11, formed on one end of the said stem. Formed in the upper face of the flange, surrounding the base of the stem, is a circular recess 12, of suitable diameter, and disposed within this recess, and surrounding the base of the stem, is a disk 13. The stem and flange of the plug are preferably formed from cured rubber, while the disk 13 is preferably formed from uncured rubber, this latter member having the inherent property of closely adhering to the inner face of the tire, around the inner end of the puncture opening. Furthermore, this uncured rubber disk, when pressed by the air within the tire, will fill in the cracks and crevices, at the edge of the puncture opening, thereby completely healing the puncture.

Preferably, the uncured rubber disk is of slightly smaller diameter than the recess 12, whereby to permit said disk to expand and fill the recess, in the successful operation of the device. Also, the disk may be of a thickness greater than the depth of the recess, whereby to provide for a comparatively large amount of the uncured rubber, which will fill in the crevices of the puncture opening. This uncured rubber, when the plug is pressed against the inner face of the tire, by the force of the inflated inner tube, will overflow onto the face of the flange portion of the plug, whereby to cause such flange to adhere, at all points, to the tire face. It may be found necessary to clean the puncture opening with gasoline, in which event the uncured rubber disk would become sticky and quickly adhere to the tire.

If desired, rubber cement may be used, in connection with this plug, but the inherent adhesive properties of the disk 13 render the use of cement unnecessary, as the heat of the tire will so soften the disk as to permit the same to properly flow out onto the flange of the plug and properly adhere to the tire.

In Figure 4 there is shown a plug from which the recess is omitted, and disposed on the upper flat face of the flange 11', of the plug, is a sheet of friction cloth 14, the upper face of which is provided with the adhesive material 15. This cloth is centrally apertured to receive the stem 10', of the plug. It will be noted that the cloth 14 is of considerably greater area than the upper face of the flange of the plug, so that said cloth will extend beyond the periphery of the flange and cover a large area on the inner face of the tire casing, whereby to provide a more efficient and effective securing means for the patch.

What is claimed is:

1. A repair device for tires including a base of cured rubber having a recess, and an uncured rubber element removably seated in said recess.

2. A repair device for a tire including a base of cured rubber having a central recess in one face thereof, and a disk of uncured rubber removably seated within said recess.

3. A repair device for tires including a base having a central recess and a stem rising from the center of said recess, and an uncured rubber member removably seated in said recess in surrounding relation to said stem.

4. A repair device for tires including a base of cured rubber having a central recess, an integral stem rising from the center of the bottom of said recess, and a centrally apertured disk of uncured rubber removably seated within the recess and receiving the stem therethrough.

5. A repair device for tires including a base of cured rubber having a flat face and central stem rising therefrom, and a centrally apertured disk of uncured rubber of a diameter less than that of the base disposed on said base and receiving the said stem therethrough.

In testimony whereof, I affix my signature.

DAVID H. COX.